(12) United States Patent
Sibley et al.

(10) Patent No.: US 10,124,941 B2
(45) Date of Patent: Nov. 13, 2018

(54) RE-SEALABLE CONTAINER FOR A CONTROLLED SUBSTANCE HAVING A CHILD RESISTANT LID

(71) Applicant: N2 PACKAGING SYSTEMS, LLC, Twin Falls, ID (US)

(72) Inventors: David P. Sibley, Kimberly, ID (US); Randy S. Martin, Kimberly, ID (US); Michael G. Standlee, Eden, ID (US)

(73) Assignee: N2 PACKAGING SYSTEMS, LLC, Twin Falls, ID (US)

( * ) Notice: Subject to any disclaimer, the term of this patent is extended or adjusted under 35 U.S.C. 154(b) by 0 days.

(21) Appl. No.: 15/882,962

(22) Filed: Jan. 29, 2018

(65) Prior Publication Data

US 2018/0148237 A1 May 31, 2018

Related U.S. Application Data

(63) Continuation-in-part of application No. 14/519,031, filed on Oct. 20, 2014, now Pat. No. 9,878,821.

(51) Int. Cl.
*B65D 81/26* (2006.01)
*B65B 29/00* (2006.01)
(Continued)

(52) U.S. Cl.
CPC .............. *B65D 50/062* (2013.01); *A61J 1/03* (2013.01); *B65B 7/285* (2013.01); *B65D 43/0212* (2013.01); *B65D 51/228* (2013.01); *B65D 81/2076* (2013.01); *B65D 81/266* (2013.01); *G01V 15/00* (2013.01); *A61J 2205/60* (2013.01); *B65D 85/70* (2013.01); *B65D 2101/003* (2013.01); *B65D 2203/02* (2013.01); *B65D 2203/06* (2013.01); (Continued)

(58) Field of Classification Search
CPC .... B65D 25/205; B65D 29/00; B65D 50/062; B65D 51/228; B65D 81/266; B65D 81/268; B65D 85/12; B65D 2203/02; B65D 2203/06; B65B 7/28; A61J 2205/60
USPC ......... 206/204, 213.1, 236, 242, 265, 459.5, 206/524.8; 53/400, 415
See application file for complete search history.

(56) References Cited

U.S. PATENT DOCUMENTS 4,883,198 A * 11/1989 Manska ............. B65D 51/1677
222/1
7,798,319 B1 * 9/2010 Bried ..................... A24F 23/00
206/242

(Continued)

*Primary Examiner* — Luan K Bui
(74) *Attorney, Agent, or Firm* — Richard D. Clarke

(57) ABSTRACT

Provided is a re-sealable container for storing, preserving, identifying, tracking and transporting a federally controlled substance having a child resistant and senior friendly lid, and a process for identifying and tracking federally controlled substances within the re-sealable containers. The re-sealable federally controlled substance containers include a two-piece child resistant and senior friendly lid and a 2-factor authentication identification tag, as well as a microchip for identifying the container controlled substance contents and tracking the container. Controlled substance contents within the re-sealable containers are optimized for long term storage by removal of the oxygen therein, and the containers and controlled substance contents can be readily identified, detected, tracked and traced after being filled with a federally controlled substance.

20 Claims, 10 Drawing Sheets

(51) Int. Cl.
*B65D 50/06* (2006.01)
*B65D 51/22* (2006.01)
*B65B 7/28* (2006.01)
*A61J 1/03* (2006.01)
*G01V 15/00* (2006.01)
*B65D 81/20* (2006.01)
*B65D 43/02* (2006.01)
*B65D 85/00* (2006.01)

(52) U.S. Cl.
CPC .. *B65D 2215/04* (2013.01); *B65D 2251/0006* (2013.01); *B65D 2251/0096* (2013.01); *B65D 2517/0016* (2013.01); *B65D 2517/0041* (2013.01); *B65D 2585/56* (2013.01)

(56) References Cited

U.S. PATENT DOCUMENTS

| | | | | |
|---|---|---|---|---|
| 8,573,426 | B2* | 11/2013 | Maness | B09B 3/0075 206/204 |
| 2006/0144726 | A1* | 7/2006 | Foust | B65D 43/162 206/204 |
| 2011/0174639 | A1* | 7/2011 | Sibley | F42B 39/22 206/3 |
| 2012/0061263 | A1* | 3/2012 | Sibley | B65B 61/20 206/213.1 |
| 2013/0008809 | A1* | 1/2013 | Cortez | A24F 23/00 206/265 |
| 2015/0136618 | A1* | 5/2015 | Patel | A24F 23/00 206/0.5 |
| 2016/0031627 | A1* | 2/2016 | Yeh | B65D 81/266 206/204 |

* cited by examiner

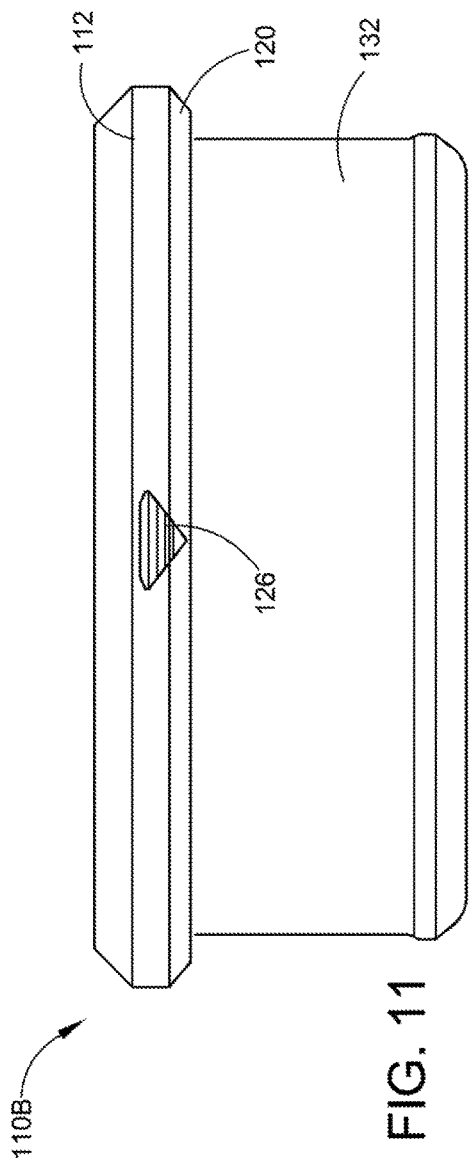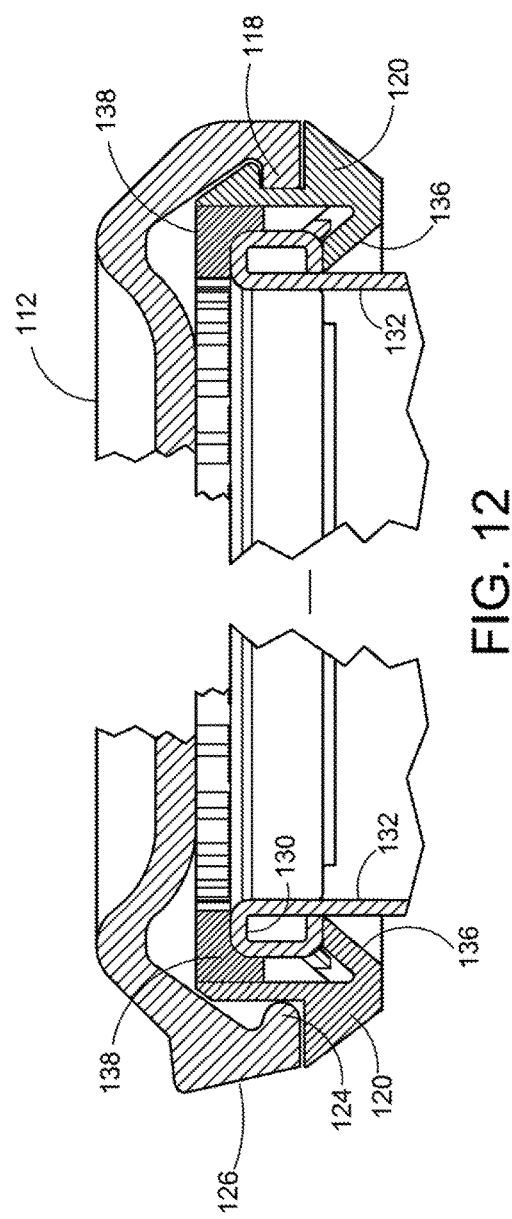

RE-SEALABLE CONTAINER FOR A CONTROLLED SUBSTANCE HAVING A CHILD RESISTANT LID

FIELD OF THE INVENTION

This application provides a re-sealable container for storing, preserving, identifying, tracking and transporting a federally controlled substance having a child resistant and senior friendly lid, and a process for identifying and tracking federally controlled substances within the re-sealable containers. In particular, the re-sealable federally controlled substance containers include a two-piece child resistant lid and a 2-factor authentication identification tag, as well as a microchip for identifying the re-sealable container controlled substance contents and tracking the container. Controlled substance contents within, the re-sealable containers are optimized for long term storage by removal of the oxygen therein, and the containers and contents can be readily identified, detected, tracked and traced after being filled with a federally controlled substance.

BACKGROUND OF THE INVENTION

A controlled substance is generally a drug or chemical whose manufacture, possession, or use is regulated by a government. Controlled substances are substances that are the subject of legislative control. This may include illegal drugs and prescription medications. In the United States for example, the Controlled Substances Act (or CSA) was passed by the $91^{st}$ US Congress as Title II of the Comprehensive Drug Abuse Prevention and Control Act of 1970 and signed into law by President Richard Nixon. The CSA is the federal US drug policy under which the manufacture, importation, possession, use and distribution of controlled substances is regulated. In the US, the Drug Enforcement Administration (DEA) is responsible for suppressing illegal drug use and distribution by enforcing the Controlled Substances Act.

Section 812 of the Controlled Substances Act (21 U.S.C. § 801et seq.) (CSA) lists substances which were controlled in 1970 when the law was enacted. Since then, approximately 160 substances have been added, removed, or transferred from one schedule to another. The current official list of controlled substances can be found in section 1308 of the most recent issue of Title 21 Code of Federal Regulations (CFR) Part 1300 to end (21 CFR § 1308) and the final rules which were published in the Federal Register subsequent to the issuance of the CFR. The following link contains a full listing of the current federally Controlled Substances defined by the DEA, as of Jan. 5, 2018: https://www.deadiversion.usdoj.gov/schedules/orangebook/c_cs_alpha.pdf.

This list describes the basic or parent chemical and do not describe the salts, isomers and salts of isomers, esters, ethers and derivatives which may be controlled substances. These lists are intended as general references and are not comprehensive listings of all controlled substances. Please note that a substance need not be listed as a controlled substance to be treated as a Schedule I substance for criminal prosecution. A controlled substance analogue is a substance which is intended for human consumption and is structurally or pharmacologically substantially similar to or is represented as being similar to a Schedule I or Schedule II substance and is not an approved medication in the United States. (See 21 U.S.C. § 802(32)(A) for the definition of a controlled substance analogue and 21 U.S.C. § 813 for the schedule).

Drugs, substances, and certain chemicals used to make drugs are classified into five (5) distinct categories or schedules depending upon the drug's acceptable medical use and the drug's abuse or dependency potential. The abuse rate is a determinate factor in the scheduling of the drug; for example, Schedule I drugs are considered the most dangerous class of drugs with a high potential for abuse and potentially severe psychological and/or physical dependence. As the drug schedule changes—Schedule II, Schedule III, etc., so does the abuse potential—Schedule V drugs represents the least potential for abuse. A Listing of drugs and their schedule are located at Controlled Substance Act (CSA) Scheduling or CSA Scheduling by Alphabetical Order. These lists describe the basic or parent chemical and do not necessarily describe the salts, isomers and salts of isomers, esters, ethers and derivatives which may also be classified as controlled substances. These lists are intended as general references and are not comprehensive listings of all controlled substances.

Note that a substance need not be listed as a controlled substance to be treated as a Schedule I substance for criminal prosecution. A controlled substance analogue is a substance which is intended for human consumption and is structurally or pharmacologically substantially similar to or is represented as being similar to a Schedule I or Schedule II substance and is not an approved medication in the United States. (See 21 U.S.C. § 802(32)(A) for the definition of a controlled substance analogue and 21 U.S.C. § 813 for the schedule).

Schedule I

Schedule I drugs, substances, or chemicals are defined as drugs with no currently accepted medical use and a high potential for abuse. Schedule I drugs are the most dangerous drugs of all the drug schedules with potentially severe psychological or physical dependence. Some examples of Schedule I drugs are: heroin, lysergic acid diethylamide (LSD), marijuana (cannabis), 3,4-methylenedioxymethamphetamine (ecstasy), methaqualone, and peyote.

Schedule II

Schedule II drugs, substances, or chemicals are defined as drugs with a high potential for abuse, less abuse potential than Schedule I drugs, with use potentially leading to severe psychological or physical dependence. These drugs are also considered dangerous. Some examples of Schedule II drugs are: cocaine, methamphetamine, methadone, hydromorphone (Dilaudid), meperidine (Demerol), oxycodone (OxyContin), fentanyl, Dexedrine, Adderall, and Ritalin.

Schedule III

Schedule III drugs, substances, or chemicals are defined as drugs with a moderate to low potential for physical and psychological dependence. Schedule III drugs abuse potential is less than Schedule I and Schedule II drugs but more than Schedule IV. Some examples of Schedule III drugs are: Combination products with less than 15 milligrams of hydrocodone per dosage unit (Vicodin), Products containing less than 90 milligrams of codeine per dosage unit (Tylenol with codeine), ketamine, anabolic steroids, and testosterone.

Schedule IV

Schedule IV drugs, substances, or chemicals are defined as drugs with a low potential for abuse and low risk of dependence. Some examples of Schedule IV drugs are: Xanax, Soma, Darvon, Darvocet, Valium, Ativan, Talwin, and Ambien.

Schedule V

Schedule V drugs, substances, or chemicals are defined as drugs with lower potential for abuse than Schedule IV and consist of preparations containing limited quantities of certain narcotics. Schedule V drugs are generally used for antidiarrheal, antitussive, and analgesic purposes. Some examples of Schedule V drugs are: cough preparations with less than 200 milligrams of codeine or per 100 milliliters (Robitussin AC), Lomotil, Motofen, Lyrica, and Parepectolin.

The transport and sales of federally controlled substances, hereinafter simply referred to as "controlled substances," has generally in the past been handled through pharmaceutical suppliers but with several states looking at the legalized sales of products like Marijuana there is a great need to identify, control, track and document these sales.

Containers carrying controlled substances should be readily identifiable both by sight and odor. Dogs are often used to locate these items, but if they are sealed where the air and moisture in the container is replaced with an inert gas along with a dehumidifying agents before sealing, dogs might not be able to locate these items. Identifying odor materials can be attached directly to the outside of the container or to the label. There are other various ways to identify these containers like colorization of the containers and their labels, bar coding and microchips either on the inside or affixed to the outside.

Problems will definitely arise from the transport of these materials from a state that legalizes it to a state where its possession is still illegal. Clearly identifying these containers will help to alleviate some of these problems. If states that legalize the sales of controlled substances like Marijuana would stipulate that it is only to be sold in an identifiable sealed container, there could be a greater control of its propagation, sales and the state taxes paid. With the legalization and controlled sales, the price would come down so that it would not be profitable for the illegal growing of the products.

Numerous innovations for pharmaceutical products have been provided in the prior art that are described as follows. Even though these innovations may be suitable for the specific individual purposes to which they address, they differ from the present design as hereinafter contrasted. The following is a summary of those prior art patents most relevant to this application at hand; as well as a description outlining the difference between the features of the canning process of controlled substances and the prior art.

U.S. Pat. No. 5,135,144 of David C. Blakley describes a belt worn and readily portable medical supply pouch for holding a supply of drug containers in a temperature stable and contamination resistant environment is disclosed. A substantially rectangular housing fabricated from a thick insulating material comprising a bottom, two side panels, a front and a back panel with an open top. A housing thus formed defines a cavity therein for storing a supply of drug cartridges. A protective panel extending across the opening of the housing and angled downward into the cavity is provided to prevent contamination from entering the cavity, while providing access by the hand of a user through the opening and down into the cavity for retrieving one of the drug containers. The housing is covered inside and out by a water-proof and contamination-resistant nylon material. Two belt loop members are affixed to the back panel of the housing for attaching the pouch to the waist belt of a user. An internal pocket inside the cavity of the housing is provided for containing a heating element for heating the interior cavity. An outside auxiliary pocket is attached to the outside surface of the front panel for storing items not requiring an insulated and contamination free environment.

This patent describes a belt worn and readily portable medical supply pouch for holding a supply of drug containers. It does not describe a single sealed container for a con trolled substance like Marijuana.

U.S. Pat. No. 5,836,474 Georan Wessberg tells of an invention that relates to a medicament storage device which includes a storage plate having a plurality of storage spaces for storing quantities, such as medicament dosages and a base unit which has a memory and an alarm function. The device is characterized in that the openings of respective storage spaces are provided with a closure means in the form of a long and a short flap which overlap one another and which are either spring mounted or consist of elastic material. The flap overlap regions include indicating means which illustrate in which direction passage has occurred through the opening and/or with detecting means which produce a signal relating to the direction of the last passage through the opening.

This patent tells of an invention that relates to a medicament storage device which includes a storage plate having a plurality of storage spaces for storing quantities, such as medicament dosages. It again does not describe a single sealed container for a controlled substance like Marijuana.

U.S. Pat. No. 5,866,219 of Paul McClure et at. relates to a product information label system haying a base member and a foldout medical information pamphlet which is applied to medicinal and drug containers where the foldout pamphlet is resealable for subsequent use.

This patent relates to a product information label system and does not deal with any form of containment means.

U.S. Pat. No. 6,793,081 Jay S. Derman describes a locking neck ring device that is placed over a capped bottle or container and grips the bottle neck ring, and together with a padlock or other securing means, prevents access to the bottle cap. The locking device comprises a clamp member that jackets a carped bottle neck; a cover which fits over the clamp member causing it to clamp on to the neck below the neck ring, and means to hold the clamp member to the cover. Provision is made for attaching a padlock or other securing means which holds the locking ring device in place. The bottle or container cap can then not be accessed for removal. The device is applicable to all sizes of drug containers, wine and liquor bottles for effectively locking access to the container contents.

This patent describes a locking neck ring device that is placed over a capped bottle or container and grips the bottle neck ring. It does not with any specific containment means.

None of these previous efforts, however, provides the benefits attendant with the process of canning a controlled substance and do not mention the use of an inert gas as a means of providing long-term storage. The present process of canning a controlled substance achieves its intended purposes, objects and advantages over the prior art through a new, useful and unobvious combination of method steps and component elements at a reasonable cost and by employing readily available materials.

In this respect, before explaining at least one embodiment of the canning a controlled substance in detail it is to be understood that the process is not limited to just a specific process set forth in the following description or illustrated in the drawings. The canning process of controlled substances is capable of having other embodiments and of being applied in various ways. In addition, it is to be understood that the phraseology and terminology employed herein are for the purpose of description and should not be regarded as limiting. As such, those skilled in the art will appreciate that the conception, upon which this disclosure is based, may readily be utilized as a basis for creating other processes for carrying out the several purposes of the present application. It is important, therefore, that the claims be regarded as including such equivalent construction insofar as they do not depart from the spirit and scope of the present application.

SUMMARY OF THE INVENTION

The principal advantage of the re-sealable container for the storage, preservation, identification, tracking and transport of a federally controlled substance having a child resistant lid is to preserve the contents of the container, control the access to the container, control the humidity in sealed containers, and enable identification of the container contents.

Another advantage of the re-sealable container and process for the storage, preservation, identification, tracking and transport of a federally controlled substance is to control the access to the container by including a child resistant lid.

Another advantage of the re-sealable container and process for the storage, preservation, identification, tracking and transport of a federally controlled substance is to control the humidity within the sealed container through the use of 2-way humidity control packets.

Another advantage of the re-sealable container and process for the storage, preservation, identification, tracking and transport of a federally controlled substance is the option of the removal of the oxygen and moisture prior to sealing, and alternatively, flooding the container with an inert gas prior to sealing.

Another advantage of the re-sealable container and process for the storage, preservation, identification, tracking and transport of a federally controlled substance is that with an external odor substance, dogs will be able to locate it.

Another advantage of the re-sealable container and process for the storage, preservation, identification, tracking and transport of a federally controlled substance is that they can have a micro-chip on the inside or outside for product locating.

Another advantage of the re-sealable container and process for the storage, preservation, identification, tracking and transport of a federally controlled substance is the use of an electronically readable identification tag on the outside for container content product identification.

Another advantage in the re-sealable container and process for the storage, preservation, identification, tracking and transport of a federally controlled substance is that a variety of different BPA-free, BPS-free and BPF-free materials are used in the construction of the container.

Another advantage is that unlined metal cans can be used as the re-sealable container for the storage, preservation, identification, tracking and transport of a federally controlled substance when an organic (paper, cloth or rice cake) liner is used in the packing of the container and the organic liner is positioned between the can contents and the metal can and where the organic (paper, cloth or rice cake) liners are constructed of recyclable eco-friendly materials.

Another advantage of the re-sealable container and process for the storage, preservation, identification, tracking and transport of a federally controlled substance is that an inexpensive form container can be made in different sizes and shapes, including metal cans, lined metal cans, plastic containers, etc.

Yet another advantage of the container and process for the storage, preservation, identification, tracking and transport of a federally controlled substance is it can use a variety of different child resistant lids that are also senior friendly in that they are difficult for children to open yet relatively easy for seniors to open.

These together with other advantages in the container and process for the storage, preservation, identification, tracking and transport of a federally controlled substance, along with the various features of novelty, which characterize the process, are pointed out with particularity in the claims annexed to and forming a part of this disclosure. For a better understanding of the container and process for the storage, preservation, identification, tracking and transport of a federally controlled substance and its operating advantages and the specific objects attained by its uses, reference should be made to the accompanying drawings and descriptive matter in which there are illustrated preferred and alternate embodiments of the container and process for the storage, preservation, identification, tracking and transport of a federally controlled substance. There has thus been outlined, rather broadly, the more important features of the container and process for the storage, preservation, identification, tracking and transport of a federally controlled substance in order that the detailed description there of that follows may be better understood, and in order that the present contribution to the art may be better appreciated. There are additional features of the container and process for the storage, preservation, identification, tracking and transport of a federally controlled substance that will be described hereinafter and which will form the subject matter of the claims appended hereto.

The preferred embodiment of re-sealable container and process for the storage, preservation, identification, tracking and transport of a federally controlled substance will be placing the controlled substance into the preformed metal container with a 2-way humidity control device on the inside and an identification label on the outside. The process will begin by inserting a controlled substance and 2-way humidity control packet, preferably a disc packet device or a pillow-shaped packet device. If a microchip is desired within the container it is put in before inserting the controlled substance. The controlled substance is then sealed inside the container and the container is fitted with a child resistant lid. All of the different configurations of containing the controlled substance within numerous container embodiments, and with numerous child resistant lid configurations will be covered within the scope of this application.

If the container and process for the storage, preservation, identification, tracking and transport of a federally controlled substance in an inert atmosphere is desired the container is placed into a vacuum chamber. The chamber doors are closed and a vacuum of approximately 26-29 inches of mercury is drawn on the chamber. This removes all of the atmosphere/oxygen and atmospheric moisture that may be present. The vacuum is then halted, and the chamber is then optionally flooded with gaseous nitrogen. The gas is inert and dry, creating a benign atmosphere inside the container and around the controlled substance. This dry, inert environment now created inside the container will arrest the degradation of the controlled substance. The shelf life/storage time created by this process should give the controlled substance stored inside the container almost an unlimited life regardless of the environment outside the container. This application is not limited to gaseous nitrogen. Alternate methods can include liquid nitrogen, oxygen absorbers along with other inert gases such as carbon dioxide, helium, and argon. Any process used to create an inert/benign atmosphere while canning the controlled substances will be covered within the scope of this application.

After the evacuation/flooding process is complete the chamber doors are opened and the container, filled with nitrogen, is pushed out and immediately put through the conventional canning seaming process. The nitrogen gas that is in the container at this time is very heavy, dense, and cold and is not naturally trying to diffuse into the air in the room allowing fora reasonable amount of time to apply a lid and seal the container. An alternate method of packaging would be to simply place the controlled substance in the container with a 2-way humidity control packet and hermetically seal the container.

After the container has been sealed and the child resistant lid placed on the container, an identifying tag can be adhered directly to the container or the container label. If an external microchip or radio frequency identification tag (RFID) is desired it can be adhered to the outside of the can or be incorporated into a plastic removable locking ring around the top of the can. The label can also have an identifying bar code imprinted on it or the bar code can be printed on the can. The preferred identification tag will be electronically readable, will have 2-factor or 3-factor authentication properties, and when read electronically will indicate the contents of the container along with other relevant data about the source, origin, species, brand, net weight, and any number of other characteristics not readily discerned without opening the sealed container.

An alternate embodiment of the of the re-sealable container and process for the storage, preservation, identification, tracking and transport of a federally controlled substance would be the use of an organic (paper, cloth or rice cake) liner inserted within an unlined metal can container. The organic (paper, cloth or rice cake) liner insert would be positioned between the metal can and the controlled substance contents. In this way, a less expensive unlined metal can container may be employed, and the more expensive enamel lined metal can is then optional.

Additionally, a two-piece child resistant lid can be mounted on the container to control access to the re-sealable container after the placement of a controlled substance inside. This child resistant lid will also be senior friendly in that it will be both difficult for children to open but relatively easy for seniors to open.

Furthermore, in the process of canning the controlled substances for maximized preservation, the oxygen may be removed from the re-sealable container during the process in one of four ways: (1) injection into the re-sealable container of inert gas before hermetically seating the container; (2) flooding the re-sealable container with inert gas before sealing the re-sealable container; (3) passing the re-sealable container under a free flowing stream of inert gas before sealing the re-sealable container; and (4) addition of an oxygen absorber packet into the container before sealing the re-sealable container.

With respect to the above description then, it is to be realized that the optimum dimensional relationships fur the parts of this application, to include variations in size, materials, shape, form, function and manner of operation, assembly and use, are deemed readily apparent and obvious to one skilled in the art. All equivalent relationships to those illustrated in the drawings and described in the specification intend to be encompassed by the present disclosure. Therefore, the foregoing is considered as illustrative only of the principles of the container and process for the storage, preservation, identification tracking and transport of a federally controlled substance. Further, since numerous modifications and changes will readily occur to those skilled in the art, it is not desired to limit the design to the exact construction and operation shown and described, and accordingly, all suitable modifications and equivalents may be resorted to, falling within the scope of this application.

BRIEF DESCRIPTION OF THE DRAWINGS

The accompanying drawings, which are incorporated in and form a part of this specification, illustrate embodiments of the process of canning a controlled substance and together with the description, serve to explain the principles of this application.

FIG. 11 depicts an alternate embodiment of the re-sealable container having a child resistant (and senior friendly) can lid illustrating a side view of a conventional can incorporating the 2-piece child resistant lid.

FIG. 12 depicts a cross section through an assembled alternate embodiment of the re-sealable container having a child resistant container lid illustrating the locking nib section and the can locking member with the addition of a lid section securing unit.

For a fuller understanding of the nature and advantages of the container and process for the storage, preservation, identification, tracking and transport of a federally controlled substance, reference should be had to the following detailed description taken in conjunction with the accompanying drawings which are incorporated in and form a part of this specification, illustrate embodiments of the process together with the description, serve to explain the principles of this application.

DETAILED DESCRIPTION OF THE PREFERRED EMBODIMENTS

Figure 1:
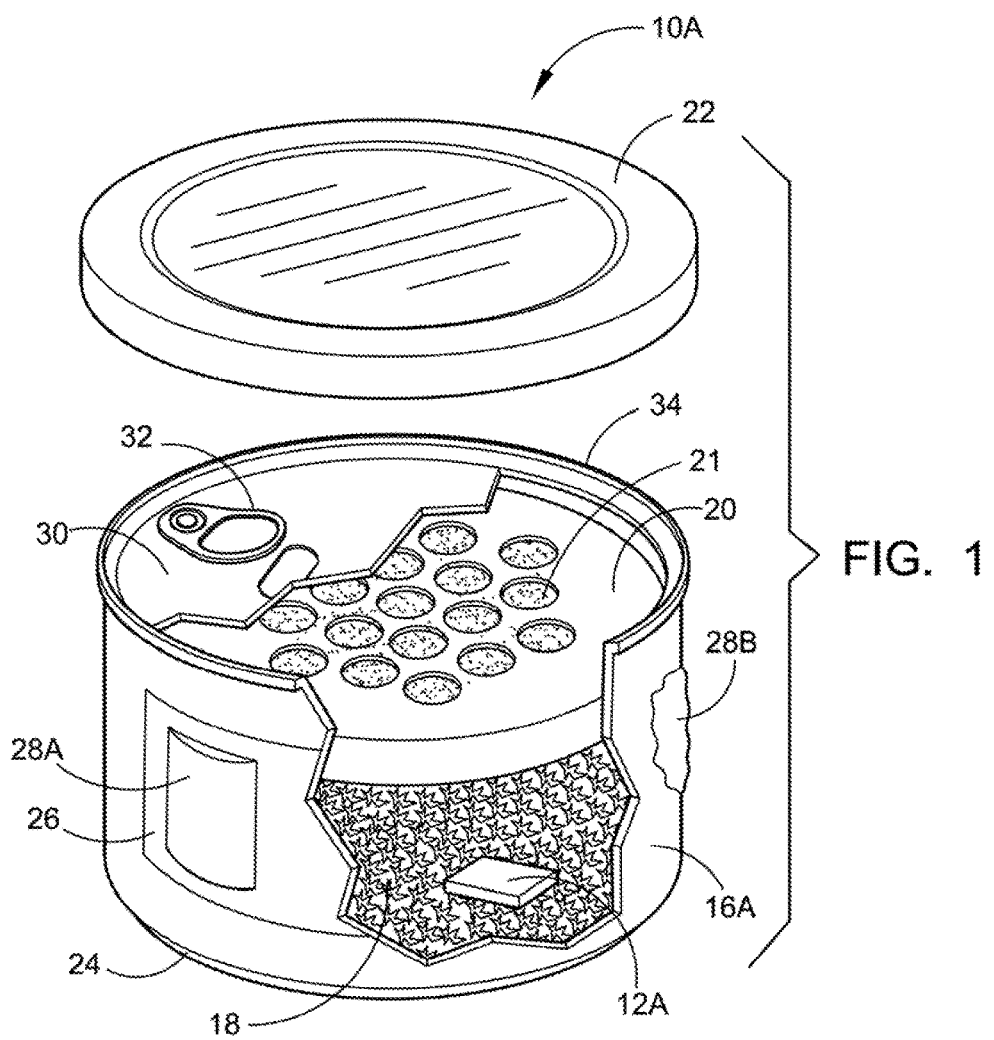
FIG. 1 depicts a perspective view of a tamper-resistant easy open container configured to contain a controlled substance and enable identification of the internal contents of such container cut away illustrating a microchip on the bottom of the can with a 2-way humidity control device on the top of the controlled substance contained by the can, having a re-sealable plastic lid shown above.

Referring now to the drawings, wherein similar parts of the re-sealable container and process of containing a controlled substance for preservation and identification is illustrated there is seen in FIG. 1 a perspective view of a conventional pop-top can assembly 10A cut away illustrating the internal microchip 12A in the container with the controlled substance 18 at the bottom of the container 16A. The controlled substance 18 has a 2-way humidly control device 20 on the top portion of the container positioned between the easy Open pop top lid 30 and the controlled substance 18, also illustrating to removed plastic lid 22 above the container 16A. The container 16A will consist of a conventional pressed formed metal can without a crimped edge on the container bottom edge 24. The container 16A will have a label 26 where an external odor substance 28A can be located, or the external odor substance 28B can be adhered to the outside surface of the container 16A. The process of storing the controlled substance in an inert atmosphere is optional at this time. A tamper resistant easy open lid 30, possibly configured in any of numerous con-figurations, here shown as a pop-top lid 30 with an opening tab 32, which will be sealed to the container top edge 34 of container 16A.

Figure 2:
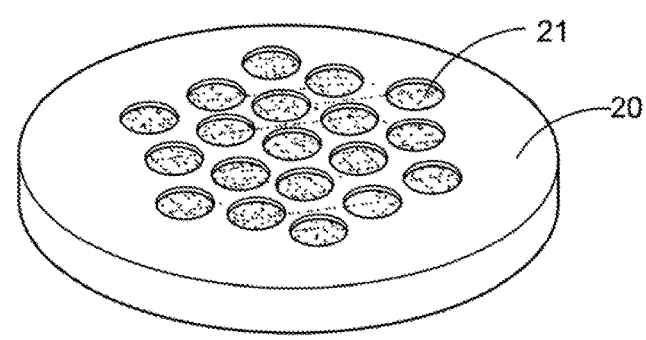
FIG. 2 depicts a perspective view of a disc shaped 2-way humidity control device having a plurality of holes therein.

FIG. 2 depicts a perspective view of a disc-shaped 2-way humidity control device 20. The 2-way humidity control device 20 will have a plurality of holes 21 in the top and bottom of the device. 2-way humidity control devices are readily available. Some of the top brands include Boveda, Integra Boost, Humi Flow, D'Addario and Supra-dri, to name a few off the shelf 2-way humidity control packet devices. These 2-way humidity control devices come in a variety of shapes and sizes and can be custom made to control the humidity to within tight percentages, for example between 48% and 52% relative humidity. These 2-way humidity control devices are commonly used to maintain humidity for tobacco products, etc. The anticipated 2-way humidity control devices used in the present invention are disc-shaped and pillow shaped (see FIGS. 4 and 8 below). The optimal humidity level for each controlled substance varies. The 2-way humidity control devices are inserted into the re-sealable container for a controlled substance to maintain the humidity therein at an optimal level for each controlled substance contained.

Figure 3:
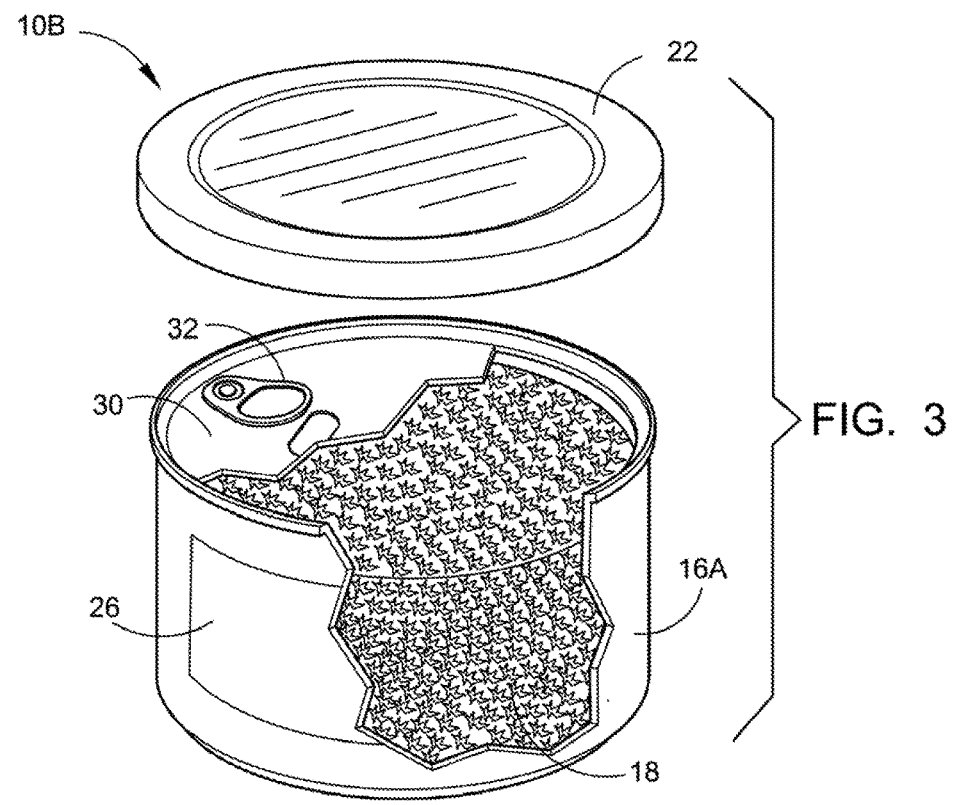
FIG. 3 depicts a perspective view of a tamper-resistant easy open container configured to contain a controlled substance and enable identification of the internal contents of such container cut away illustrating the container completely filled with the controlled substance with the plastic lid shown above.

FIG. 3 depicts a perspective view of a re-sealable tamper resistant easy open container 10B for a controlled substance, configured to contain a controlled substance 18 and to enable identification of the internal sealed contents of such a re-sealable container 10B using a standard label 26 affixed to the outside surface of the re-sealable container 10B. This cut away view illustrates the re-sealable container 10B filled with the controlled substance 18 and having a plastic lid 22 above container 16A. After the re-sealable container JOB is opened, by removal of easy open lid 30 by pulling on tab 32, the plastic lid 22 can then be placed on the top of the open container 16A.

Figure 4:
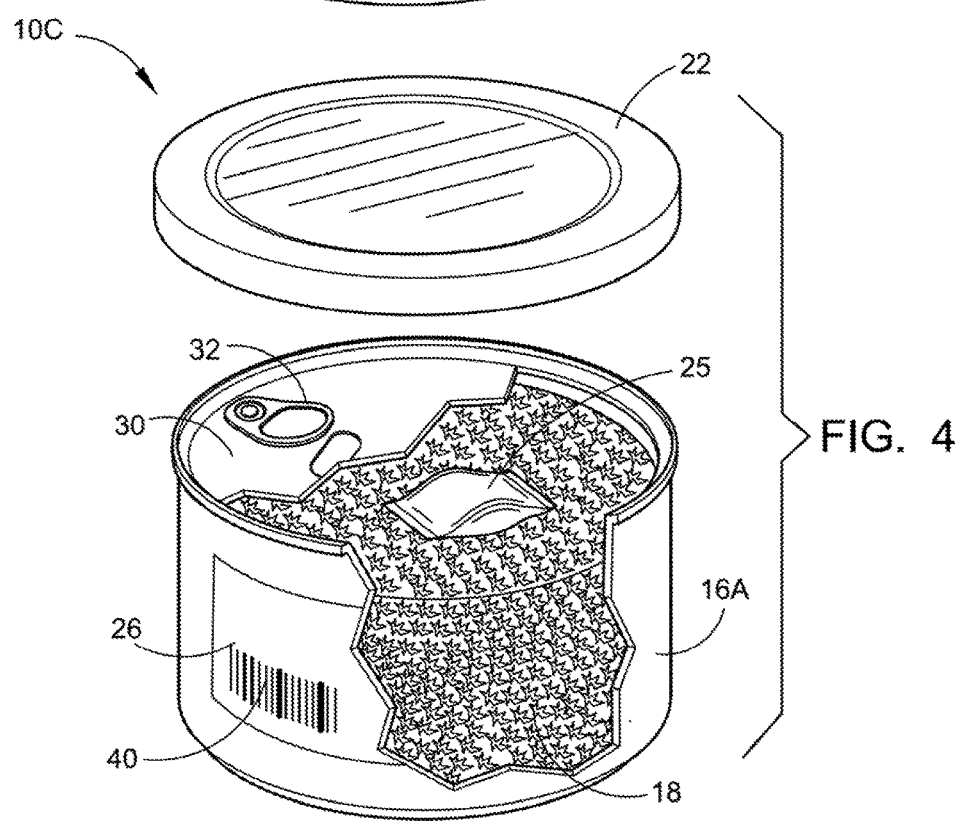
FIG. 4 depicts a perspective view of a tamper-resistant easy open container configured to contain a controlled substance and enable identification of the internal contents of such container cut away illustrating the controlled substance on the bottom of the container with a pillow-shaped 2-way humidity control device sealed within the container, having a barcode on the label and the plastic lid shown above.

FIG. 4 depicts a perspective view of a tamper resistant easy open container 10C configured to contain a controlled substance 18 and enable identification of the internal contents using a label 26 having a barcode 40 thereon. Re-sealable container 10C has been cut away illustrating the controlled substance 18 on the bottom of the container 16A with a pillow-shaped 2-way humidity control device placed on top of the controlled substance 18. The plastic lid 22 above the container 16A can be used to re-seal the container after it has been opened by removing the pop top easy open lid 30.

Figure 5:
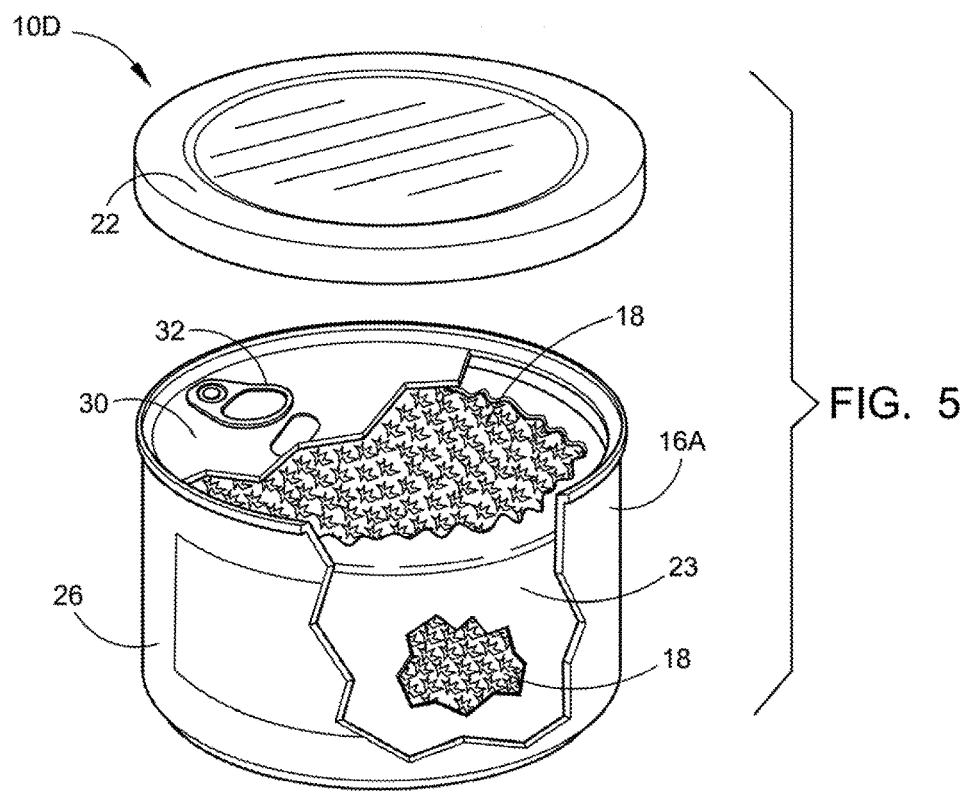
FIG. 5 depicts a perspective view of a tamper-resistant easy open container configured to contain a controlled substance and enable identification of the internal contents of such container cut away illustrating the controlled substance on the bottom of the container with an organic (paper, cloth or rice cake) liner positioned between the container and the controlled substance in the container, and the plastic lid shown above.

FIG. 5 depicts a perspective view of a re-sealable container 10D having tamper resistant easy open lid 30, with a pull tab 32. This re-sealable container 10D is an unlined metal can 16A for containing a controlled. substance. The standard label 26 will enable identification of the internal contents of such container 10D. This cut away view illustrates the controlled substance 18 on the bottom of the container 16A with an organic (paper, cloth or rice cake) liner 23 inserted between the controlled substance 18 and the metal can 16A such that the controlled substance does not come in direct contact with the metal can container 16A. In this way, a container having no pre-coated liner, such as an enamel lining, can be used. This represents a significant cost savings as unlined metal can are very inexpensive, and organic (paper, cloth or rice cake) liners are also inexpensive.

Figure 6:
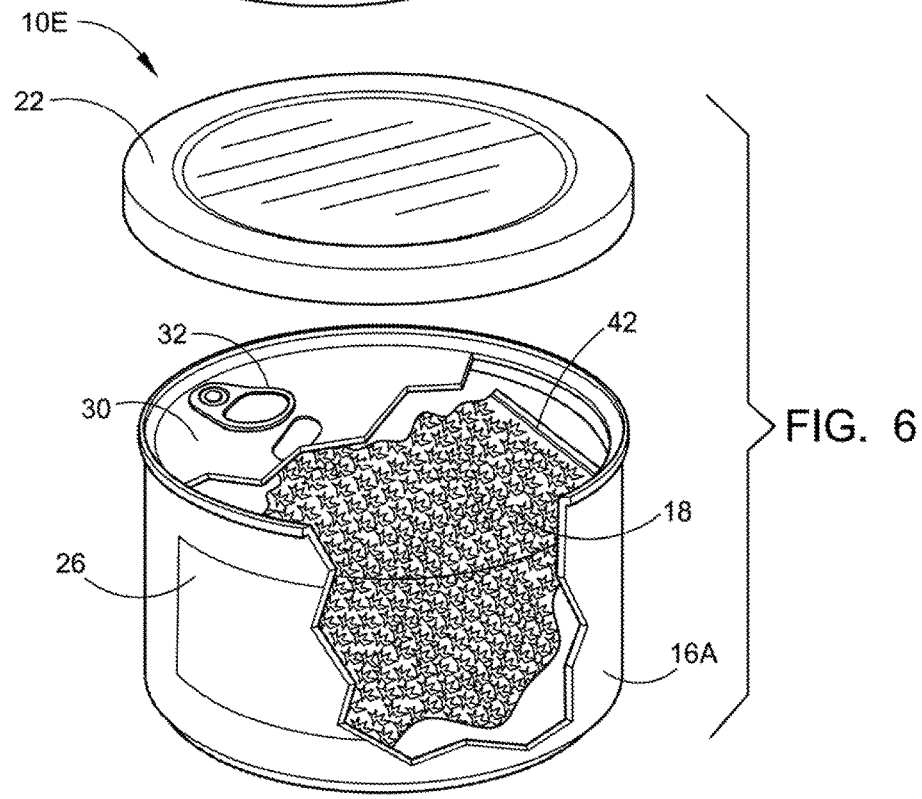
FIG. 6 depicts a perspective view of a tamper-resistant easy open lined sealed container configured to contain a controlled substance and enable identification of the internal contents of such container using a standard label with the controlled substance in the lined sealed container.

FIG. 6 depicts a perspective view of a re-sealable container 10e having tamper resistant easy open lid 30, with a pull tab 32. This re-sealable container 10E is a lined metal can 16A for containing a controlled substance. The standard label 26 will enable identification of the internal contents of such container 10D. This cut away view illustrates the controlled substance 18 on the bottom of the container 16A with an enamel liner 42 coating the entire inner surface of the metal container 16A such that the controlled substance does not come in direct contact with the metal can when inside the container 16A. Alternatively, a sealed bag may be used within the container to accomplish the same goal of keeping the controlled substance from direct contact with the metal can.

Figure 7:
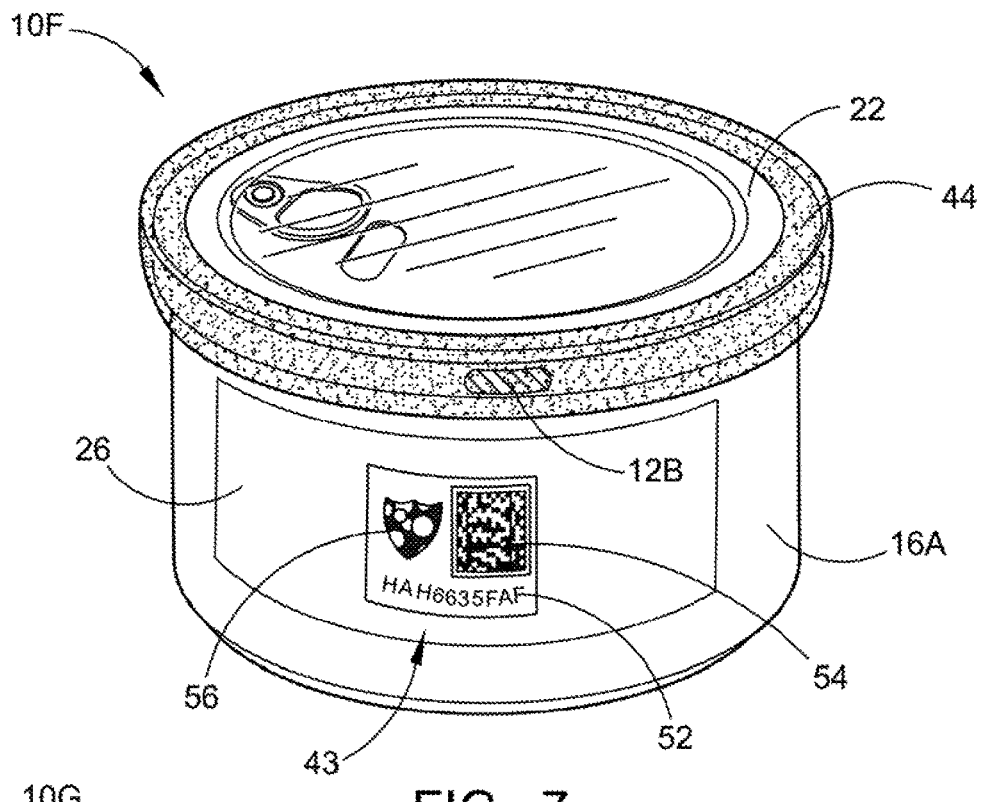
FIG. 7 depicts a perspective view of a tamper-resistant easy open sealed container configured to contain a controlled substance and enable identification of the internal contents of such container with the plastic removable locking ring incorporating microchip secured by the plastic removable locking ring and having an electronically readable identification (ID) tag having 3 elements of authentication thereon.

FIG. 7 depicts a perspective view of a re-sealable container 10G having a tamper resistant easy open lid 30 and pull tab 32. Re-sealable container 10G has two ways of identifying and tracking the contents of the container: (1) adhered to a standard label 26 is a 2-factor authentication system 43; and (2) an external microchip 12B secured by a plastic removable locking ring 44 over the plastic lid 22 and the top edge 34 of the container 16A. The microchip 12B is demonically readable and can be used to track the container.

The 2-factor authentication and identification (ID) tag 43 contains three elements for positively identifying the container and its contents. These three factors include a QR code 54, a serial number 52 and a unique image 56 comprising a shape symbol (here a shield shape) having random three dimensional (3D) structures in each symbol forming an irreproducible holographic fingerprint. The QR code is readable by electronic means and can reveal the container contents and other data such as source, date, brand, origin, etc. of the container contents. A model for the preferred system and method of authentication is covered in US pending patent application publication US 2017/028074 A1, Applicant Authentic Vision GMBH, by inventors Thomas Weiss and Thomas Bergmüller. Electronic reading of the ID tag 43 authenticates and verifies the contents and reveals other relevant data about those contents. The re-sealable container 10F could also be tamper proof and configured to contain a controlled substance and enable identification as well as tracking of the internal contents of such a re-sealable container 10F with the plastic removable locking ring 44 over the plastic lid 22 and the top edge 34 of the container 16A incorporating the external microchip 12B. Using both of these methods together act as redundant ID systems.

Figure 8:
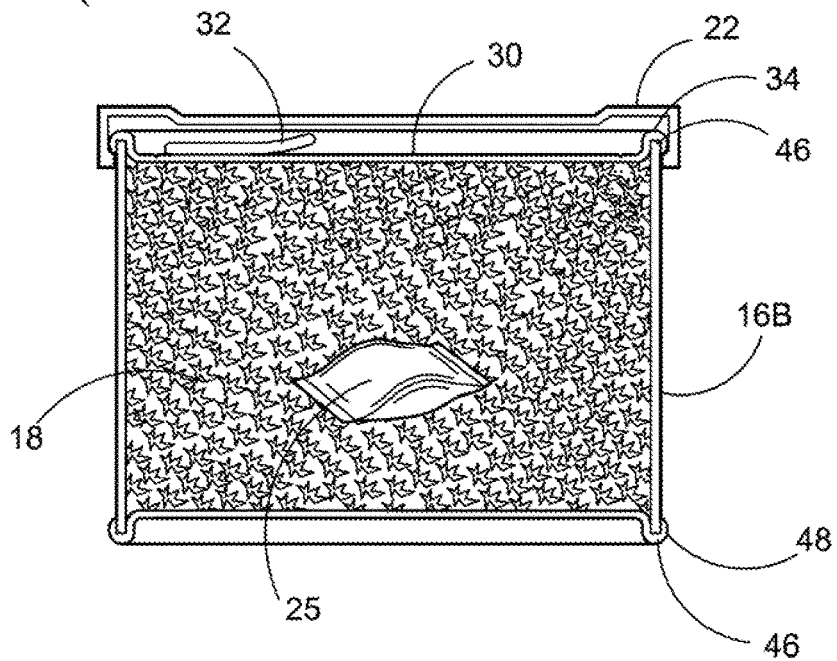
FIG. 8 depicts a cross section of a tamper-resistant easy open container configured to contain a controlled substance and enable identification of the internal contents of such container with a crimped edge on the bottom as well as the top. It should be understood that a conventional three-part metal can could be used, with or without a pop-top feature (if a conventional three-part metal can is used without a tamper-resistant easy open "pop-top" feature, then it would necessitate a can opener be used to open the can to make the contents accessible), also having a pillow-shaped 2-way humidity control device sealed within the container.

FIG. 8 depicts a cross section of re-sealable container 10F additionally having a pillow-shaped 2-way humidity control device 25 placed within the container with the controlled substance therein. This three-part tamper resistant lid 22 easy open container 10G is configured to contain a controlled substance and enable identification of the internal contents using the methods described for FIG. 7 (unique ID tag 43 and microchip 124 not shown). Such re-sealable container 10G has a crimped edge 46 on the container bottom edge 48 as well as a crimped edge 34 on the container top edge.

Figure 9:
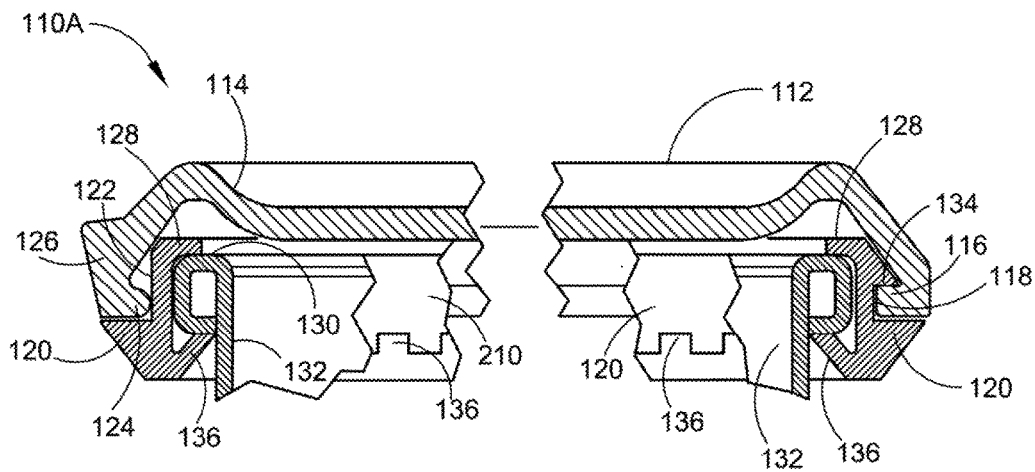
FIG. 9 depicts a cross section of the preferred embodiment of the assembled 2-piece child resistant (and senior friendly) can lid in place over the top of the re-sealable container for a controlled substance conventional can.

FIG. 9 depicts the preferred embodiment of the re-sealable container for a controlled substance with a child resistant and senior friendly) can lid 110A. There is seen in FIG. 9 a cross section view of the upper portion of a re-sealable container 10A illustrating the preferred embodiment of the child resistant can lid indicating the lid 112 with a contoured surface 114 to secure additional cans for stacking. A locking inner ring 116 of the lid 112 engages within the external locking trough 118 in the circumference of the can locking member 120 with a relief area 122 to access the nib section 124 of the lid 112 for the removal of the lid 112 when an upward pressure is applied at the lifting indicator section 126. The top surface 128 of the can locking member 120 rests on the rim 130 of the can 132 and is held in place by the upper surface 134 of the external locking trough 118. A series of restraining teeth 136 around the lower inner surface of the of the can locking member 120 are bent up when the when the locking member 120 is forced over the top rim 130 of the can 132 to engage under the lip of the can 130.

Figure 10:
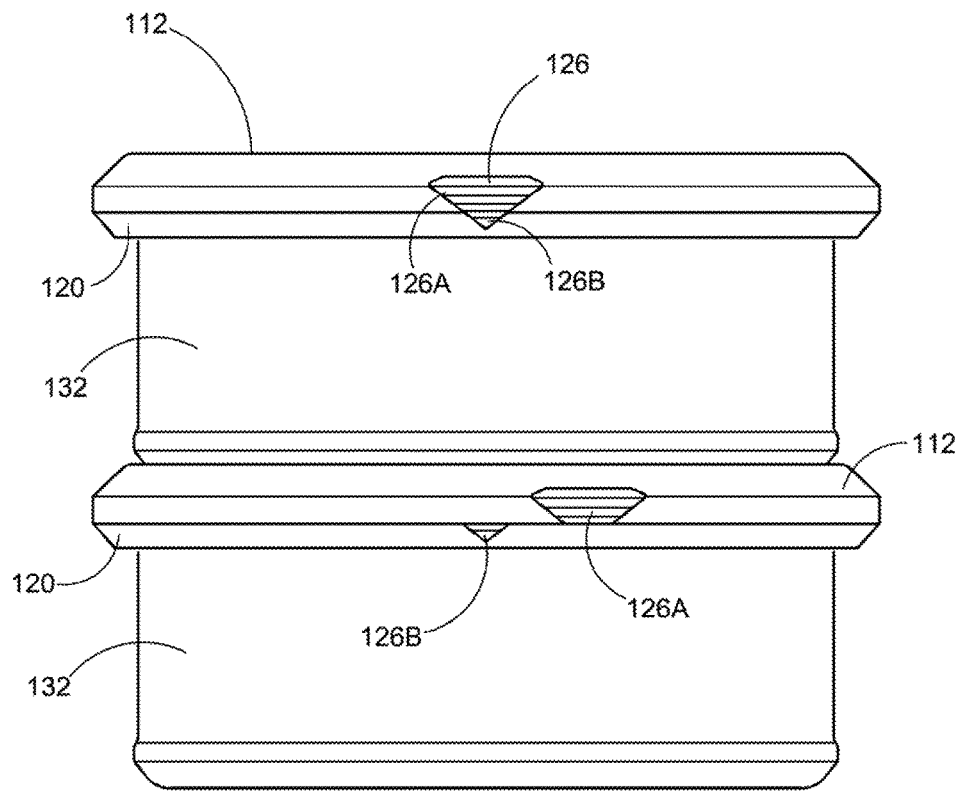
FIG. 10 depicts a side view of two re-sealable containers with the child resistant (and senior friendly) can lid stacked one on top of the other having the upper can with the two parts of the indicator section in the can opening position and the lower can with the indicator section separated in the can locked position.

FIG. 10 depicts a side view of two stacked re-sealable containers 132 with the lower container 132 having the two sections of the lifting indicator section 126, the upper lifting indicator section 126A and the lower lifting indicator section 126B merged together in the opening position. The lower can has the lid 112 rotated so that indicator section 126A is moved to the right putting the lid 112 in the locking or locked position.

FIG. 11 depicts a side view of the re-sealable container 110B constructed of a conventional metal can 132 incorporating an alternate embodiment of the child resistant (and senior friendly) can lid 110B.

FIG. 12 depicts a cross section through the assembled alternate embodiment of the child resistant can lid 110B with the conventional can 132 having a locking nib 124 and the can locking member 120 with the addition of a securing unit 138.

Figure 13:
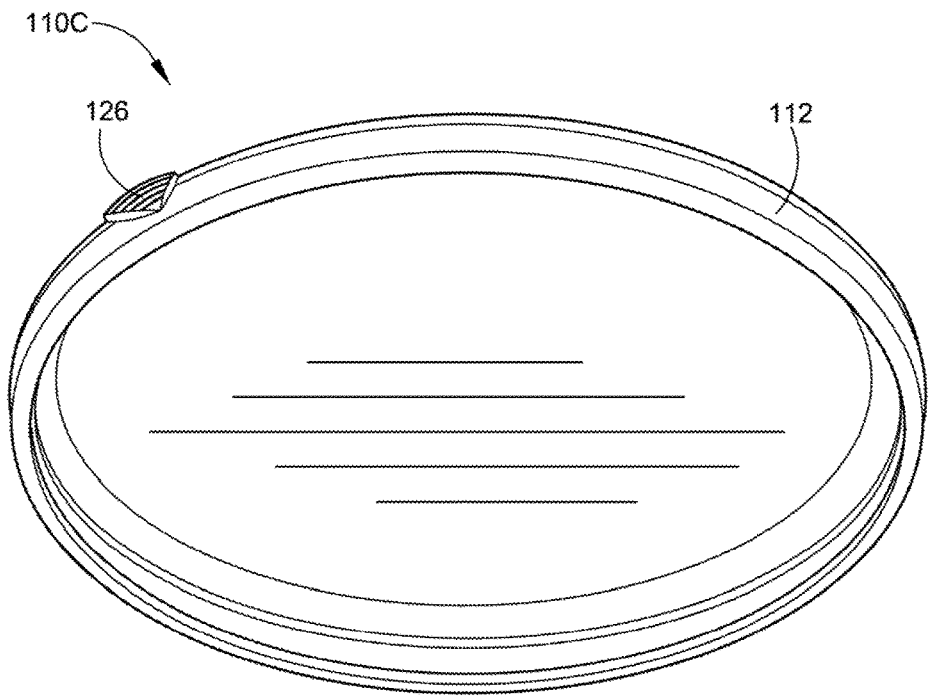
FIG. 13 depicts a bottom perspective view of the top piece of a child resistant lid for a re-sealable container.

FIG. 13 depicts a bottom perspective bottom view of another alternate embodiment of the top piece of a two-piece child resistant can lid 110C lid 112 illustrating the upper lifting indicator section 126A.

Figure 14:
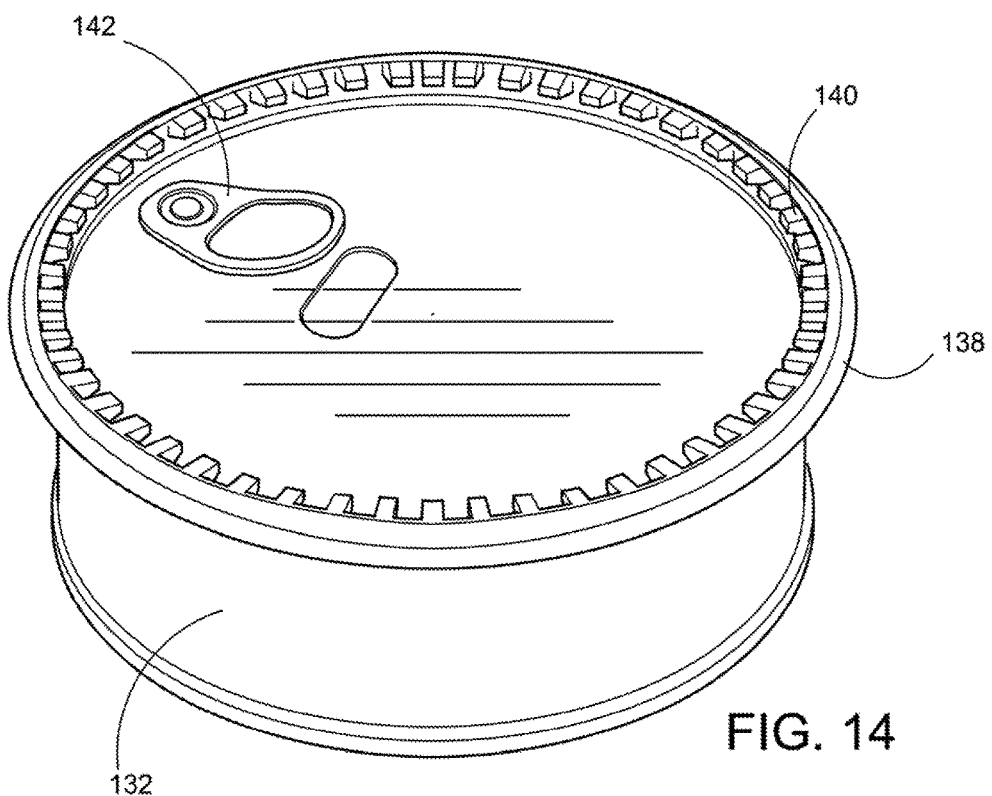
FIG. 14 depicts a top view of an alternate embodiment of a re-sealable container illustrating a child resistant lid bottom piece in place on a container having a pop top easy open lid accessible after the child resistant lid is opened.

FIG. 14 depicts a top perspective view of the re-sealable container constructed from a conventional metal can 132 with an easy open "pop-top" opener 142 and the securing unit 138 in place, having numerous teeth 140.

Figure 15:
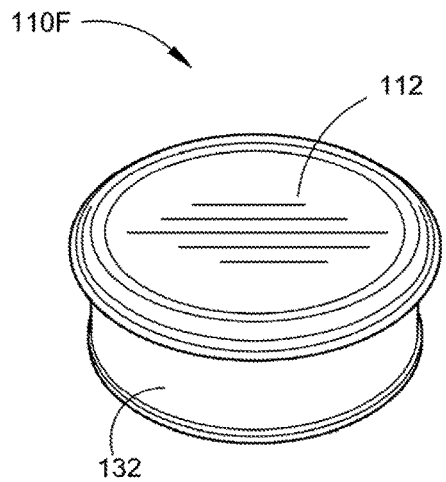
FIG. 15 depicts a perspective view of another alternate embodiment of the re-sealable container having a child resistant lid on a container.

FIG. 15 depicts a re-sealable container 110F in a top perspective view illustrating an alternate embodiment of the child resistant (and senior friendly) can lid 112 positioned on top of the container 110F and fully assembled and mounted on the container 110F with the lid 112 on a conventional can type of container 132.

Figure 16:
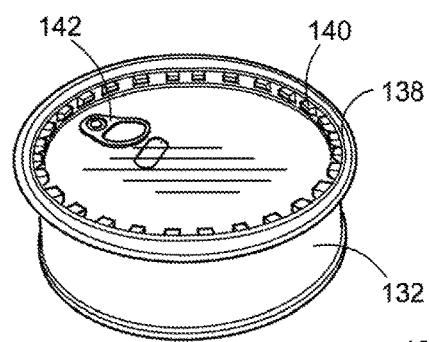
FIG. 16 depicts a perspective view of the top of a conventional can with pop top opener and the 2-piece lid securing unit in place on top of the re-sealable container.

FIG. 16 depicts a perspective view of the top of a conventional can 132 with pop-top opener 142 and the securing unit with the tops of the 124 wedge teeth 140 in can locking member 120.

Figure 17:
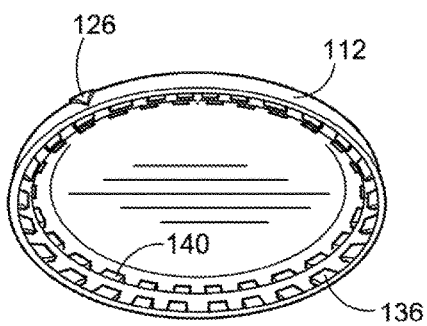
FIG. 17 depicts a bottom perspective view of the assembled child resistant lid with the 2-piece lid securing unit in place, in accordance with the present invention.

FIG. 17 depicts a bottom view of an assembled alternate embodiment of the child resistant (and senior friendly) can lid for use on re-sealable container 110F with the securing unit 138 illustrating the 124 restraining teeth 136 and the 124 wedge teeth 140.

Figure 18:
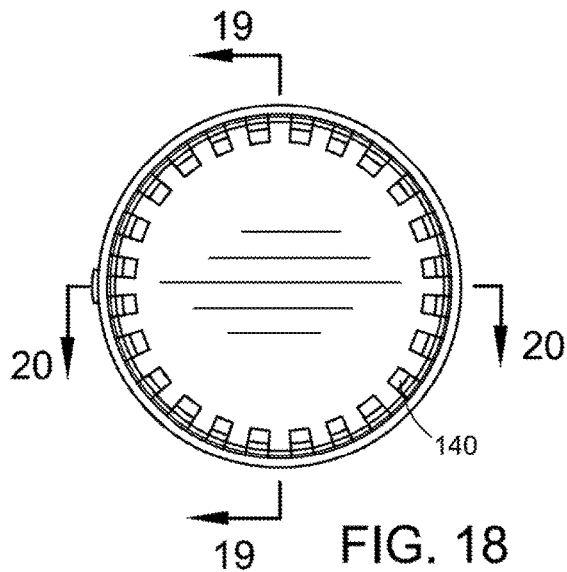
FIG. 18 depicts a bottom plan view of the child resistant lid.

FIG. 18 depicts a bottom view of an assembled alternate embodiment of the child resistant (and senior friendly) can lid for use on re-sealable container 110F illustrating the location of the wedge teeth 140.

Figure 19:
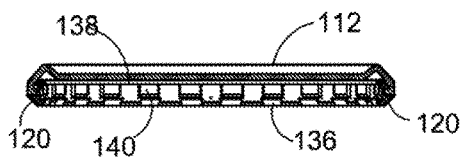
FIG. 19 depicts a cross section of the assembled child resistant lid.

FIG. 19 depicts a cross section of the assembled an assembled alternate embodiment of the child resistant (and senior friendly) can lid for use on re-sealable container 110F showing the lid 112, the can locking member 120 and the restraining teeth 136.

Figure 20:
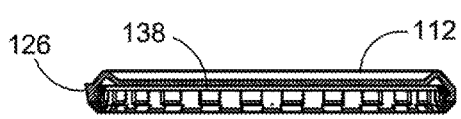
FIG. 20 depicts a cross section of the assembled child resistant lid, illustrating the location of the indicator section on the left side, in accordance with the present invention.

FIG. 20 depicts a cross section of the assembled an assembled alternate embodiment of the child resistant (and senior friendly) can lid for use on re-sealable container 110F illustrating the location of the indicator section 126 on the left side.

Figure 21:
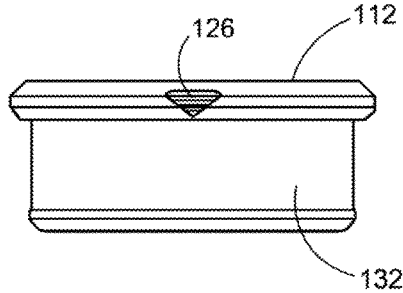
FIG. 21 depicts aside view of a re-sealable container incorporating the child resistant lid.

FIG. 21 depicts a cross section of the assembled an assembled alternate embodiment of the child resistant (and senior friendly) can lid for use on re-sealable container 110F illustrating the indicator section 126 merged into the opening or unlocked position, ready to be opened.

Figure 22:
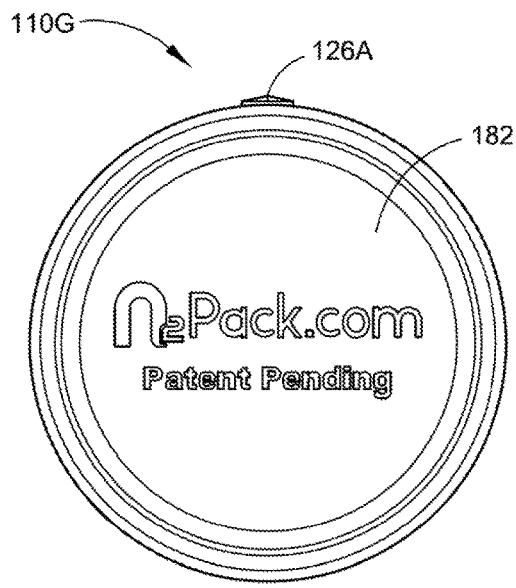
FIG. 22 depicts a top view of another alternate embodiment of the child resistant lid illustrating a vacuum sealing child resistant container lid.

FIG. 22 depicts a top view of an assembled alternate embodiment of the child resistant (and senior friendly) can lid for use on re-sealable container 110G illustrating the configuration of a vacuum sealing lid 182 having an upper lifting indicator section 126A.

Figure 23:
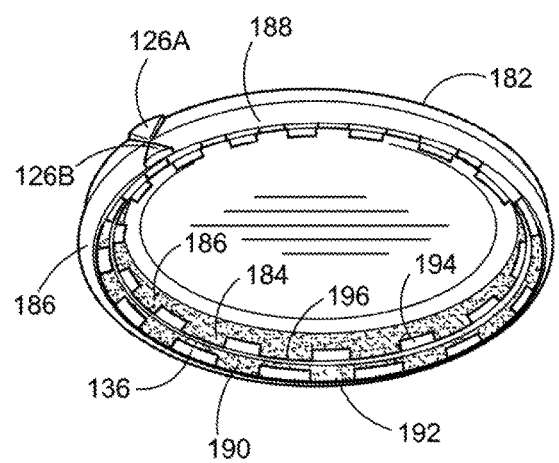
FIG. 23 depicts a bottom perspective view of the underside of the child resistant vacuum sealing container lid.

FIG. 23 depicts a bottom perspective view of a vacuum sealing lid 182 with a rubber sealant coating 184 applied to the lid inner surface 186, with the vacuum sealing can locking member 188 having the rubber sealant 190 applied on the inner surface of the edge 192. The inner surface of the vacuum sealing can locking member 188 has a plurality of restraining teeth 136 on the lower edge 192 and a plurality of upper supporting teeth 194 on the upper edge 196.

Figure 24:
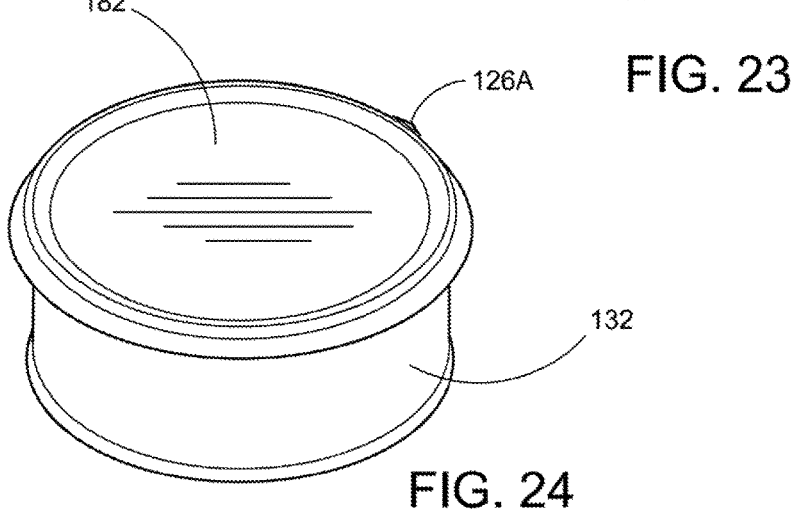
FIG. 24 depicts a top perspective view of the top surface of the re-sealable container showing a child resistant vacuum sealing lid on the container.

FIG. 24 depicts a perspective view of the top surface of the vacuum sealing lid 182 mounted on a re-sealable container for controlled substances, here incorporated onto a conventional metal can 132. It is also anticipated that the re-sealable container could be constructed of thermoplastics. Plastic containers may be coated or uncoated, lined or unlined.

Example of Use of the Re-Sealable Container

Small quantity usage is pervasive in federally controlled substances of all kinds. Because of the varying availability of packaging sizes, consumers are able to only open and expose small amounts of product at a time, thus eliminating the exposure of the product inside to the elements. This allows the consumer to keep and store their products for longer periods of time instead of utilizing them in a shorter period of time because of the shorter shelf life of exposed product. For example, with Marijuana: An eighth of an ounce of marijuana. fits neatly into a nitrogen packed container, which is approximately the same size as a typical container of chewing tobacco. A plastic over cap is applied to the containers. Four of these containers can be stacked and held together by a plastic shrink sleeve if desired. While the total amount of Marijuana in possession (in those US states which have legalized it) is currently ½ ounce, only a $\frac{1}{8}^{th}$ ounce is exposed to the elements at any given time. The other $\frac{3}{8}^{th}$ ounce is sealed and stored tightly in the remaining containers, and stays as fresh as when it was first introduced into the containers for storage and preservation. All re-sealable containers for a controlled substance will come with a pull top tamper resistant lid below a child resistant lid affixed to the top of the container. These re-sealable containers may be made of metal or plastic, coated or uncoated, lined or unlined. Organic (paper, cloth or rice cake) liner inserts and or resealable bags may also be used.

Example of the Canning Process

Figure 25:
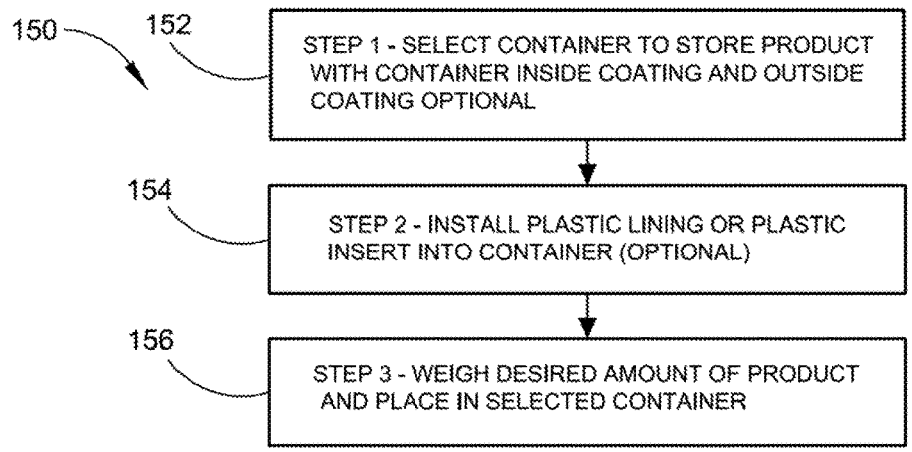
FIG. 25 illustrates a flow chart of the first three steps, Step 1, Step 2 and Step 3 in the process of tilling a. re-sealable container for the storage, preservation, identification, tracking and transport of a federally controlled substance.

FIG. 25 illustrates a flow chart of the first three steps in the process 150 for the storage, preservation, identification, tracking and transport of a federally controlled substance. Step 1 152 includes the proper size container is selected to store the marijuana, a container that fits the portion to be processed. The container can be a metal/tin can with a vinyl or enamel coating inside. A coated container is preferred. This coating will shield the product from coming in contact with the bare metal of the can and possibly reacting with the metal. The outside of the container could be coated with either a vinyl or an epoxy to prevent rust. An organic (paper, cloth or rice cake) liner insert may be used with unlined metal cans.

A plastic lined can is preferred, to include but not limited to a plastic lining or coating on the inside of the can to protect the product from coming in contact with bare metal/tin and causing a reaction, for example, transfer of a metallic taste to the product and/or having moist product coming in direct contact with an metal material. Furthermore, when plastic containers are used, it is preferred to use bisphenol A (BPA), bisphenol S (BPS) and bisphenol F (BPF) free plastic materials making up the container. BPA is found in polycarbonate plastics and resin that store foods and beverages, such as water bottles. Scientific studies indicate that BPA may act as an endocrine disruptor in the human body. BPS is a common replacement for BPA in plastics, and it too, has been linked to health risks. BPF is a BPA substitute that has been shown to act as an endocrine disruptor, in a similar manner as BPA.

Step 2 154 includes a plastic lining or insert can be installed, this coating or lining will shield against the product coming in contact with the bare metal of the can, and possibly reacting with the metal. Containers can also be made of composite material, (a composite can), a plastic can, a plastic pail or a plastic bucket.

Step 3 156 includes the product, (in this example, marijuana), is then weighed and placed in the can, or weighed in the can, (minus the tare weight of the can).

Figure 26:
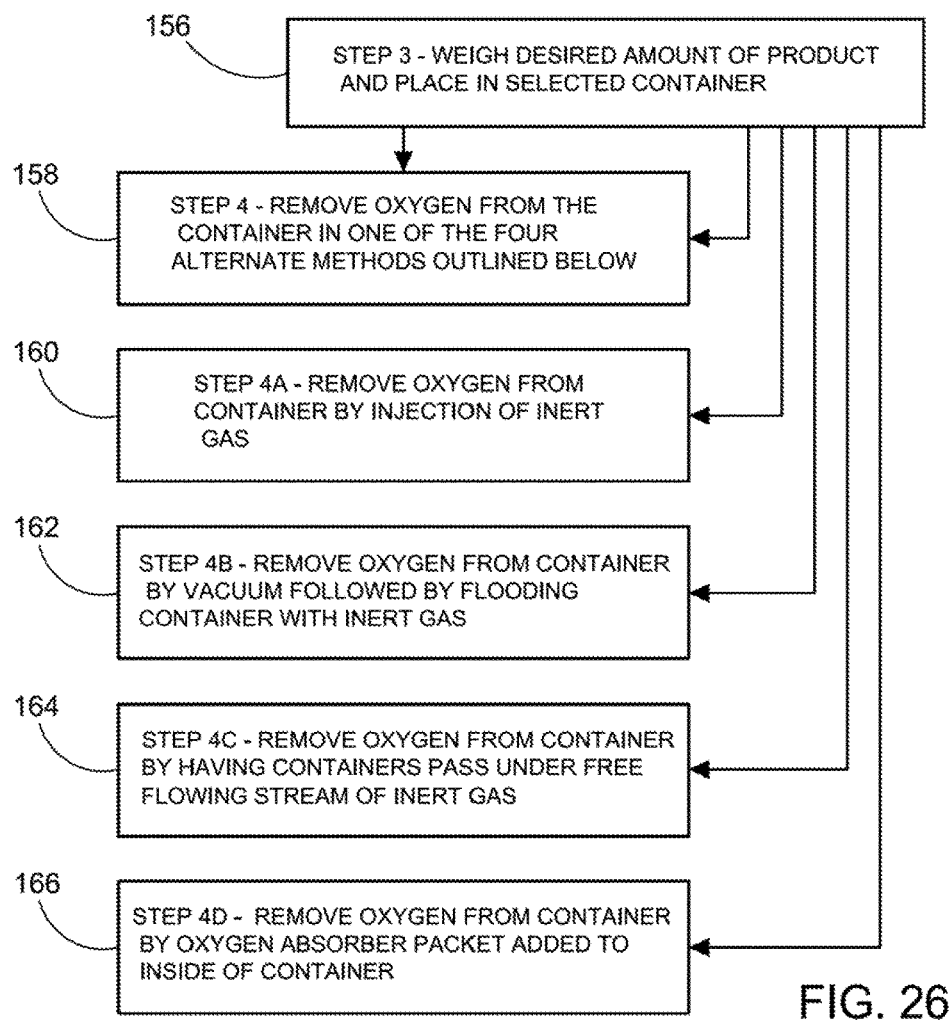
FIG. 26 illustrates a flow chart of the last two steps in the process for the storage, preservation, identification, tracking and transport of a federally controlled substance, namely, outlining four methods carrying out Step 4 of removing the oxygen from the container before the re-sealable container is hermetically sealed.

FIG. 26 illustrates a flow chart of the last two steps in the process 150 for the storage, preservation, identification, tracking, and transport of a federally controlled substance. Here again, Step 3 156 includes the product (for example, marijuana), is then weighed and placed in the can, or weighed in the can, (minus the tare weight of the can). Following Step 3 156, Step 4 158 includes the can or container is now run through a process to remove the oxygen from the container. This is accomplished through the use of inert gases, to include but not limited to the insertion of liquid or gaseous inert gases, i.e. nitrogen, carbon dioxide, helium, etc., to create a benign, dry, non-reactive atmosphere inside the can to stabilize and preserve the product.

This is achieved in one of four alternative method steps as described below:

Method Step 4A 160 includes removing the oxygen by having the can/container pass under a system that injects inert liquid gas (nitrogen preferred). The liquid is cold and dense. It immediately begins to gasify, thus displacing the atmospheric oxygen from the can/container. Before the gasification is complete, the can is sealed with a "pop top" lid and a seam is completed, leaving a nitrogen atmosphere inside the can/container.

This process can also be achieved by Step 4B 162 by placing the can, or cans, or containers, in a vacuum chamber, evacuating the chamber and then flooding the chamber with gaseous nitrogen or any inert gas, then quickly sealing (seaming) the cans before the colder dense gas warms and tries to escape.

A third method of replacing the oxygen is shown in Step 4C 164 which is to allow the filled cans to pass under a free falling, free flowing stream of nitrogen as it travels to the machine to be lidded and seamed. In lieu of injecting a measured quantity of liquid nitrogen in to the can as it moves toward the lidder/seamer, it is now replaced with just passing under a falling stream of cold, dense nitrogen. This achieves an oxygen removal displacement. This method is effective but allows much of the nitrogen to be wasted in the surrounding area.

A fourth method, as illustrated in Step 4D 166 would be to place an oxygen absorber packet inside the can prior to lidding. This will turn the available oxygen inside the can into iron oxide, thus effectively removing the oxygen in the can/container.

In summary, there are four basic configurations in which the federally controlled substances could be canned, (1) canned within a lined re-sealable container, loosely alone with no insert; (2) canned within a lined re-sealable container with a 2-way humidity control device inserted; (3) canned with an unlined can having an organic (paper, cloth or rice cake) insert, and (4) canned with an unlined can having an organic (paper, cloth or rice cake) insert, and additionally having a 2-way humidity control device inserted. Alternatively, the contents may be pre-packaged in a sealed plastic bag or foil envelope. Finally, bulk amounts of controlled substances could be stored and transported in large sealed re-sealable containers such as polymer pails, with and without 2-way humidity control devices and with or without organic (paper, cloth or rice cake) inserts.

Furthermore, in summary, in the process of canning the federally controlled substances for long term storage and maximized preservation, the oxygen is removed from the container during the process in one of four ways: (1) injection into the container of inert gas before sealing the container (2) flooding the container with inert gas before sealing the container; (3) passing the container under a free flowing stream of inert gas before sealing the container; and (4) addition of an oxygen absorber packet into the container before sealing the container.

Moreover, it is anticipated that many other federally controlled substances such as pharmaceuticals will be stored, preserved, identified, tracked and transported using the present invention and inventive method. This is to include but not limited to using the same process for other drugs, pills, powders, and liquids to stabilize and preserve, giving them a longer shelf life, as some medications degrade rapidly in the presence of atmospheric moisture, oxygen, and light. This process is to include possible refrigeration of the cans to slow degradation of the products inside, in some cases even freezing the canned product. In the case of marijuana, low temperatures are desirable, but freezing will harm the product. It is also anticipated that sublimation or "freeze-drying" may be employed with a variety of controlled substances that do not lose potency when freeze-dry processes are used. Sublimation is another method of stabilizing controlled substance products. If done correctly, the moisture of the product inside the container is removed and the natural breakdown or degradation of the container contents is arrested. This prevents the need for adding chemical preservatives and it makes refrigeration optional.

In addition, the present invention is directed at solving problems in scent detection and/or scent suppression for containers of federally controlled substances. Depending on the desired situation, when properly filled, no marijuana is allowed to come in contact with the outside of the container, and when properly sealed, the product cannot be detected by drug-sniffing dogs. If detection is desired, the container simply needs to come in contact with the marijuana on the outside of the container. The scent lingers and drug sniffing does can detect/locate the product. Alternatively, the previously described label having an odor adhered portion can be employed to enhance the detection of the federally controlled substance contents within the container so labeled.

Further, the purpose of the foregoing abstract is to enable the US Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

We claim:

1. A re-sealable container for storage, preservation, identification, tracking and transport of a federally controlled substance comprising:
    a) a one or more-piece airtight container having an outer portion having an exterior surface and an inner portion having an interior surface, an upper portion and a lower portion, configured for containing a federally controlled substance;
    (b) a 2-way humidity control device inserted within said airtight container;
    (c) a re-sealable two-piece child resistant lid affixed to said upper portion of said airtight container; and
    (d) identifying indicia including an electronically readable identification tag located on the outer portion exterior surface of said airtight container, for identifying and tracking the contained federally controlled substance contents within said container;
    wherein said airtight container configured for containing a federally controlled substance is securely re-sealable using said child resistant lid, after the sealed airtight container is opened to access the controlled substance within said airtight container.

2. The re-sealable container for storage, preservation, identification, tracking and transport of a federally controlled substance according to claim 1, wherein said one or more-piece airtight container includes a metal container having an organic insert between the filled controlled substance and the metal.

3. The re-sealable container for storage, preservation, identification, tracking and transport of a federally controlled substance according to claim 1, wherein said one or more-piece airtight container includes a plastic composite container.

4. The re-sealable container for storage, preservation, identification, tracking and transport of a federally controlled substance according to claim 1, wherein a one-piece tamper resistant lid is affixed to said upper portion of said airtight container directly below said re-sealable two-piece child resistant lid and said one-piece tamper resistant lid includes a pop-top one-piece tamper resistant easy open lid with a pull tab.

5. The re-sealable container for storage, preservation, identification, tracking and transport of a federally controlled substance according to claim 1, wherein said 2-way humidity control device inserted within said airtight container is disc-shaped and pillow-shaped.

6. The re-sealable container for storage, preservation, identification, tracking and transport of a federally controlled substance according to claim 1, wherein an external odor from a federally controlled substance is adhered during the container controlled substance filling process, for the purpose of allowing federal agencies, drug-sniffing dogs, and others to detect the presence of the federally controlled substance contents contained therein.

7. The re-sealable container for storage, preservation, identification, tracking and transport of a federally controlled substance according to claim 1, wherein said identifying indicia is located affixed to said outer portion of said airtight container and comprises an electronically readable microchip, enabling tracking and identification of the re-sealable container contents.

8. The re-sealable container for storage, preservation, identification, tracking and transport of a federally controlled substance according to claim 1, wherein said identifying indicia located on said outer portion exterior surface for identifying the contained federally controlled substance contents within said container includes an electronically readable 2-factor authentication identification tag.

9. The re-sealable container for storage, preservation, identification, tracking and transport of a federally controlled substance according to claim 8, wherein said electronically readable 2-factor authentication identification tag further includes a QR code, a serial number and a random shaped holographic symbol having random three-dimensional (3D) holographic structures in each random shaped holographic symbol, forming an irreproducible holographic fingerprint.

10. The re-sealable container for storage, preservation, identification, tracking and transport of a federally controlled substance according to clam 1, wherein said re-sealable two-piece child resistant lid includes:
 a contoured upper surface to secure additional cans for stacking;
 a locking inner ring having a plurality of restraining teeth which engage with an external locking trough located on the circumference of a locking member having a relief area to access a nib section; and
 an indicator section having an upper indicator section and a lower indicator section, which when aligned allow opening of the container, but when not aligned lock the container;
 wherein removal of the lid is accomplished when an upward pressure is applied by lifting said upper indicator section when said upper indicator section and said lower indicator section are aligned.

11. A method for making a re-sealable container for the storage, preservation, identification, tracking and transport of a federally controlled substance, comprising the steps of:
 (a) providing a one or more-piece airtight container having an outer portion having an exterior surface and an inner portion having an interior surface, an upper portion and a lower portion, configured for containing a federally controlled substance;
 (b) inserting a 2-way humidity control device within said airtight container;
 (c) affixing a re-sealable two-piece child resistant lid to said upper portion of said airtight container; and
 (d) applying identifying; indicia including an electronically readable identification tag located to the outer portion exterior surface of said airtight container, for identifying and tracking the contained federally controlled substance contents within said container;
 wherein said airtight container configured for containing a federally controlled substance is securely re-sealable using said child resistant lid, after the sealed airtight container is opened to access the controlled substance within said airtight container.

12. The method for making a re-sealable container for storage, preservation, identification, tracking and transport of a federally controlled substance according to claim 11, wherein said one or more-piece airtight container includes a metal container having an organic insert between the filled controlled substance and the metal.

13. The method for making a re-sealable container for storage, preservation, identification, tracking and transport of a federally controlled substance according to claim 11, wherein said one or more-piece airtight container includes a plastic composite container.

14. The method for making a re-sealable container for storage, preservation, identification, tracking and transport of a federally controlled substance according to claim 11, wherein a one-piece tamper resistant lid is affixed to said upper portion of said airtight container directly below said re-sealable two-piece child resistant lid and said one-piece tamper resistant lid includes a pop-top one-piece tamper resistant easy open lid with a pull tab.

15. The method for making a re-sealable container for storage, preservation, identification, tracking and transport of a federally controlled substance according to claim 11, wherein said 2-way humidity control device inserted within said airtight container is disc-shaped and pillow-shaped.

16. The method for making a re-sealable container for storage, preservation, identification, tracking and transport of a federally controlled substance according to claim 11, wherein an external odor from a federally controlled substance is adhered during the container controlled substance filling process, for the purpose of allowing federal agencies, drug-sniffing dogs, and others to detect the presence of the federally controlled substance contents contained therein.

17. The method for making a re-sealable container for storage, preservation, identification, tracking and transport of a federally controlled substance according to claim 11, wherein said identifying indicia is located affixed to said outer portion of said airtight container and comprises an electronically readable microchip, enabling tracking and identification of the re-sealable container contents.

18. The method for making a re-sealable container for storage, preservation, identification, tracking and transport of a federally controlled substance according to claim 11, wherein said identifying indicia located on said outer portion exterior surface for identifying the contained federally controlled substance contents within said container includes an electronically readable 2-factor authentication identification tag.

19. The method for making a re-sealable container for storage, preservation, identification, tracking and transport of a federally controlled substance according to claim 18, wherein said electronically readable 2-factor authentication identification tag further includes a QR code, a serial number and a random shaped holographic symbol having random three-dimensional (3-D) holographic structures in each random shaped holographic symbol, forming an irreproducible holographic fingerprint.

20. The method for making a re-sealable container for storage, preservation, identification, tracking and transport of a federally controlled substance according to claim 11, wherein said re-sealable two-piece child resistant lid includes:
  a contoured upper surface to secure additional cans for stacking;
  a locking inner ring having a plurality of restraining teeth which engage with an external locking trough located on the circumference of a locking member having a relief area to access a nib section; and
  an indicator section having an upper indicator section and a lower indicator section, which when aligned allow opening of the container, but when not aligned lock the container;
  wherein removal of the lid is accomplished when an upward pressure is applied by lifting said upper indicator section when said upper indicator section and said lower indicator section are aligned.

\* \* \* \* \*